US012038351B2

(12) United States Patent
Glaun et al.

(10) Patent No.: US 12,038,351 B2
(45) Date of Patent: Jul. 16, 2024

(54) DETECTING EMISSIONS FROM VALVE PACKING

(71) Applicant: Dresser, LLC, Houston, TX (US)

(72) Inventors: Jeremy Asher Glaun, Sharon, MA (US); Melissa Gayle Allin, Oklahoma City, OK (US)

(73) Assignee: Dresser, LLC, Houston, TX (US)

( * ) Notice: Subject to any disclaimer, the term of this patent is extended or adjusted under 35 U.S.C. 154(b) by 111 days.

(21) Appl. No.: 17/566,762

(22) Filed: Dec. 31, 2021

(65) Prior Publication Data
US 2023/0213406 A1    Jul. 6, 2023

(51) Int. Cl.
*G01M 3/18*    (2006.01)
*F16K 41/04*    (2006.01)

(52) U.S. Cl.
CPC .............. *G01M 3/184* (2013.01); *F16K 41/04* (2013.01)

(58) Field of Classification Search
CPC ............................ G01M 3/184; G01M 3/2876
See application file for complete search history.

(56) References Cited

U.S. PATENT DOCUMENTS

| 5,345,812 | A | * | 9/1994 | Haboian | ............. | G01M 3/2876 |
| | | | | | | 137/557 |
| 6,763,703 | B2 | * | 7/2004 | Krieger | ............... | G01M 3/2876 |
| | | | | | | 73/49.8 |
| 9,304,053 | B2 | | 4/2016 | Smart et al. | | |
| 2010/0224004 | A1 | * | 9/2010 | Suminto | ............... | G01L 9/0055 |
| | | | | | | 438/51 |
| 2019/0078965 | A1 | * | 3/2019 | Vegetti | ................ | G01M 3/2815 |

FOREIGN PATENT DOCUMENTS

WO    WO-0140756 A2 *   6/2001   ......... F16J 15/3492

* cited by examiner

*Primary Examiner* — Alexander A Mercado
(74) *Attorney, Agent, or Firm* — Paul Frank + Collins P.C.

(57) ABSTRACT

A sensor configured to measure rate of flow of fugitive emissions on a flow control. The configurations may include devices that are sensitive to low flow or low pressure. These devices may include piezo-electric films or foams. These materials may deflect in response to flow of fluid along the outer surface of the reciprocating shaft. In one implementation, the embodiments can generate average leak rate over time and measure against regulation or specifications to ensure appropriate operation (e.g., leak suppression) of the flow control. Storing this data can provide a database of information that allows operators to benchmark performance of the flow control, for example, to correlate leaks to a certain date or time. This feature may, in turn, permit the operators to also correlate the device-specific performance to overall plant or network operations.

10 Claims, 4 Drawing Sheets

DETECTING EMISSIONS FROM VALVE PACKING

BACKGROUND

Flow controls operate in myriad applications. Many find use in industrial facilities, including as part of process lines. Designs for these devices are meant to accurately regulate flow to meet process parameters. In some applications, like those that transport hydrocarbons or fossil fuels, performance of the flow control is subject to significant regulation or operating parameters to satisfy contractor, purchasers, or end users, including allowable amounts of emissions that may emanate from the device. These "fugitive emissions" are often difficult to detect because it appears in such small quantities or occurs on the device in areas that are difficult to reach to gather accurate measurements. Techniques to detect fugitive emissions may use chemical "sniffers," thermal scanners, or acoustic or ultrasonic modalities, all of which have their own limitations, whether due to cost, labor, accuracy, or otherwise.

SUMMARY

The subject matter of this disclosure relates to improvements to detect fugitive emissions on flow controls. Of particular interest are embodiments that can measure flow of these emissions directly on the device. These embodiments may utilize sensors that are sensitive to very low flow of material that is consistent with fugitive emissions from, for example, packing material, bearings, or parts or components that may form routes for material to escape from inside the device.

DRAWINGS

Reference is now made briefly to the accompanying drawings, in which.

Figure 1:
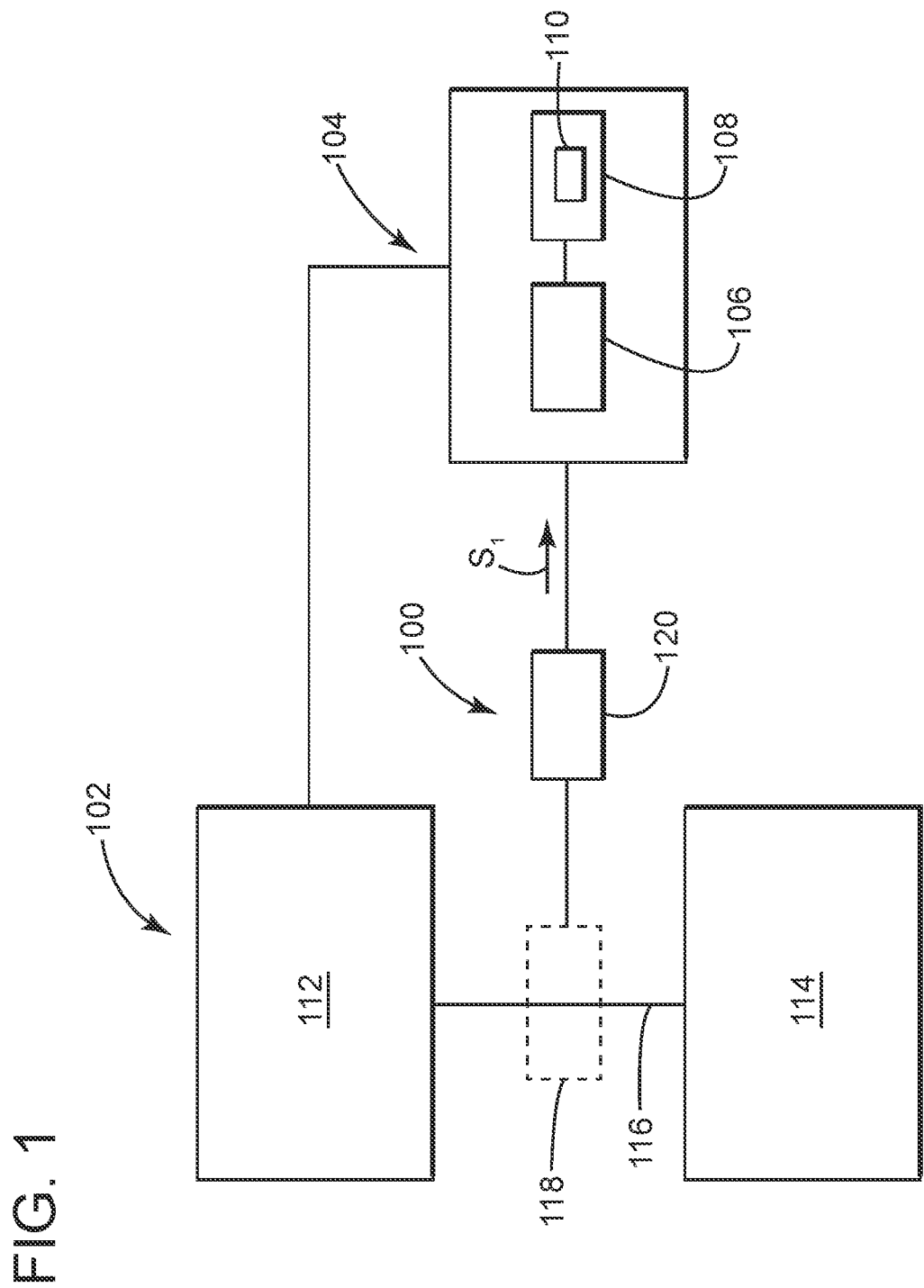
FIG. 1 depicts a schematic diagram of an exemplary embodiment of an emissions sensor.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

The drawings and any description herein use examples to disclose the invention. These examples include the best mode and enable any person skilled in the art to practice the invention, including making and using any devices or systems and performing any incorporated methods. An element or function recited in the singular and proceeded with the word "a" or "an" should be understood as not excluding plural of said elements or functions, unless such exclusion is explicitly recited. References to "one embodiment" or "one implementation" should not be interpreted as excluding the existence of additional embodiments or implementations that also incorporate the recited features.

DESCRIPTION

The discussion now turns to describe features of the embodiments shown in drawings noted above. As discussed, fugitive emissions from flow controls in place along process piping or pipelines is often regulated to very low levels, if not wholly disallowed all together. The embodiments herein detect onset of these emissions from parts of flow controls that allow for relative movement of components, for example, reciprocating or rotating movement of a shaft. These components may include "packing" that forms a tight, "flow-preventing" fit. This packing is meant to eliminate leak paths, for example, around the outer diameter of the shaft and between the outer diameter of the packing and the inner diameter of the valve body. The embodiments can install on the flow control in proximity to this packing to detect minute pressure differences that indicate flow of material. Other embodiments are within the scope and spirit of this disclosure.

FIG. 1 depicts a schematic diagram of an exemplary embodiment of an emission sensor 100. This embodiment is part of a valve assembly 102, shown here with a controller 104 that has a processing unit, for example, a processor 106 and memory 108 with executable instructions 110 stored thereon. The controller 104 may couple with an actuator 112 that connects to a valve 114 via a valve stem 116. The valve assembly 102 may also include a packing unit 118 that receives the valve stem 116. As also shown, the emissions sensor 100 may include a sensor 120 that couples with the packing unit 118. The sensor 120 may generate a signal Si for use at the processing unit.

Broadly, the emissions sensor 100 is configured to measure fugitive emissions. These configurations may include devices that can quantify flow of material, like hydrocarbon gasses. These devices may generate a response to very small changes in pressure. This response, in turn, may correspond with very low flow of fugitive emissions.

The valve assembly 102 may be configured for use in systems that transport materials. These configurations may connect in-line with conduit, like pipes and pipelines, as part of a process line or lines that transfer fluids (including liquids and gasses). Hydrocarbon operations are known to leverage these devices to regulate flow of oil & natural gas (including liquefied natural gas or "LNG") from points of extraction to process facilities or within the process facilities themselves.

The controller 104 may be configured to exchange and process signals. These configurations may connect to a control network (or "distributed control system" or "DCS"), which maintains operation of all devices on process lines. These operations may ensure that materials flow through the valve in accordance with parameters for a process. The DCS may generate control signals that describe or define operation of the valve assembly 102 for this purpose. For example, the control signal may define a commanded position for the valve assembly 102. The processing unit 106, 108, 110 may process the control signals to generate a signal to the actuator 112 that depends in large part on this commanded position.

The actuator 112 may be configured to generate a load that works against pressure of material. These configurations may employ pneumatic devices, although electrical or electronic devices (e.g., motors) may work as well. For pneumatic devices, the controller 104 may deliver its signal as gas, or "instrument air." The pneumatic devices may have a diaphragm and spring that are inside of a housing. The instrument air signal changes pressure or load against the diaphragm inside of the housing of the actuator 112.

The valve 114 may be configured to fix parameters of flow into the process line. These configurations often include hardware that couples with the pipes or pipeline. Manufacture of this hardware often comports with properties of the materials, including its composition or "phase," for example, solid, fluid, or solid-fluid mix. The valve stem 116 may embody an elongate, metal shaft with one end coupled to the actuator 112 and its other end coupled to a closure member on the valve 114. This closure member may embody a plug, ball, butterfly valve, or like implement that can contact with a seat to prevent flow. Location of the closure member relative to the seat permits more or less flow of material to pass through the valve 114 to satisfy the process parameters.

The packing unit 118 may be configured to prevent flow of fluid. These configurations may include devices that form a seal with the periphery of a shaft, like the valve stem 116. This seal can accommodate movement of the shaft. For example, the shaft may translate axially through the device. This type of reciprocating movement is consistent with linear-displacement valves, where the plug (or closure member) travels vertically relative to the seat. In other implementations, the shaft may rotate in the device. Rotary movement is often found in butterfly-valves that accommodate flow perpendicular to the axis of rotation.

The sensor 120 may be configured to measure parameters that indicate flow of material. These configurations may include devices that are sensitive to small changes in pressure. These devices may embody piezo-electric sensors with films or foams that deflect in response to small forces, like those that might result due to flow of fugitive emissions. The sensor may, in turn, generate the signal Si with a value that corresponds to the deflection. In one implementation, processing of the signal Si (at the controller 104 or processing unit, generally,) may identify flow of material through the seal. These processes may calculate values for a flow rate Q that is indicative of fugitive emissions. For example, these values may correspond with Equation (1) below:

$$Q = \frac{\pi}{8\mu}\left(-\frac{dp}{dx}\right)\left[a^4 - b^4 - \frac{(a^2 - b^2)}{\ln a/b}\right],\qquad \text{Equation (1)}$$

where Q is flow rate, μ is absolute viscosity, dp̂/dx is the rate of change of pressure in the direction of flow, and a and b are radial dimensions of an annulus through which the fugitive emissions flow.

Figure 2:
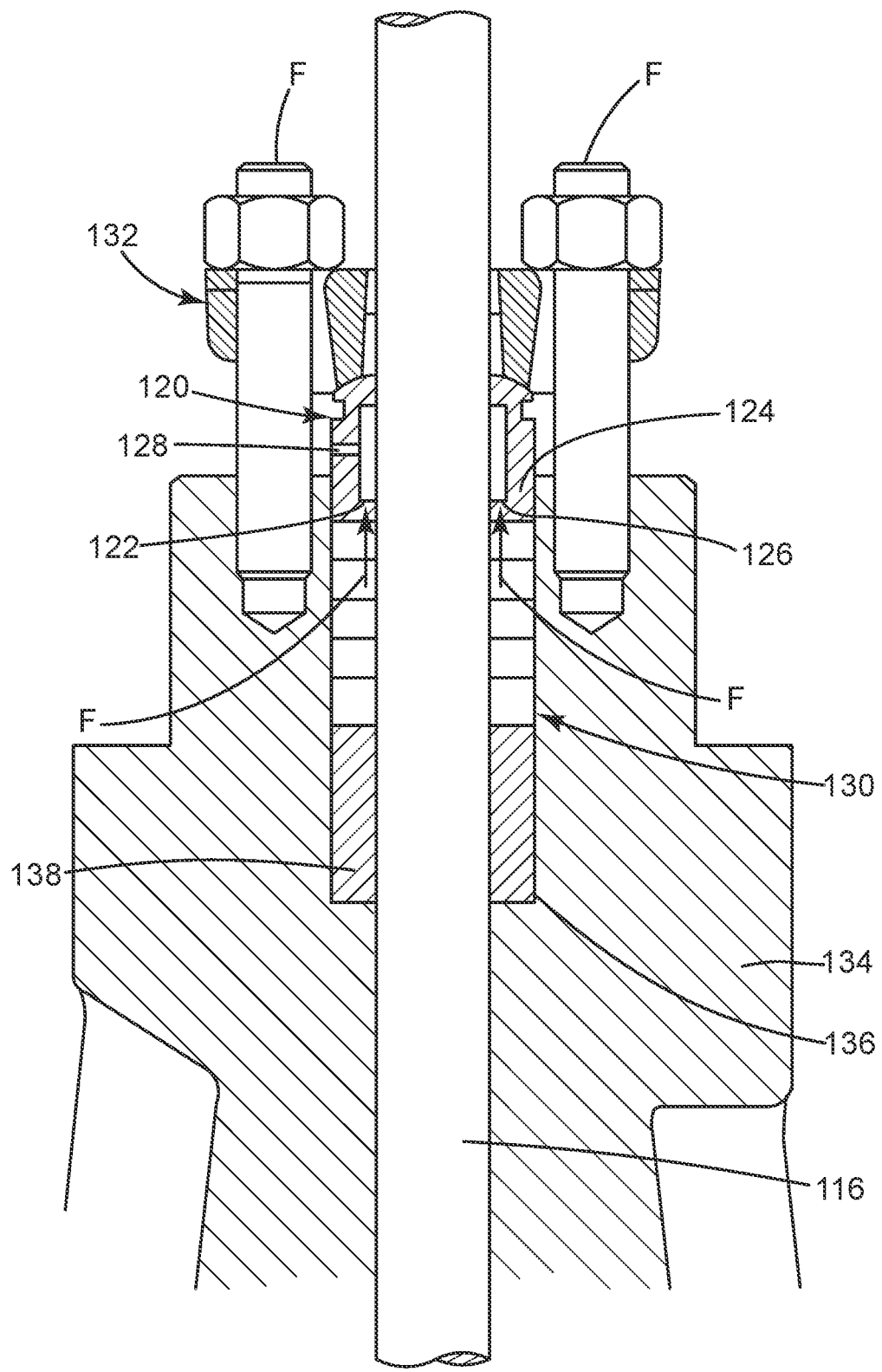
FIG. 2 depicts an elevation view of the cross-section of exemplary structure for the emissions sensor of FIG. 1.

FIG. 2 depicts an elevation view of exemplary structure for the emission sensor 100 of FIG. 1. The sensor 120 may include a piezo-electric sensing element 122, shown here as a thin film that wraps around or circumscribes the valve stem 116. In one example, the thin film may reside in a packing follower 124, for example, in a groove 126 (or "detent"). The groove 126 creates a small annular space between the inner diameter of the packing follower 124 and the valve stem 116. A vent passage 128 may extend from the groove 126 to an outer surface of the packing follower 124. The vent passage 128 may expose an outer part of the thin film to atmosphere. On one side, the packing follower 124 is adjacent packing material 130. A cap 132 contacts the packing follower 126 on the other side. Fasteners F may secure the cap 132 to an upper part of bonnet 134 of the valve 114. The bonnet 134 may have a bore 136 to receive the follower 126, material 130, and a bushing 138. Tightening the fasteners F compresses the packing material 130 against the bushing 138. Over time, though, flow F of fugitive emissions may develop between the outer diameter of the valve stem 116 and the inner diameter of the packing material 130. This leak may create a small pressure differential across the thin film as between the inner side proximate the leak and the vented side that the vent passage 128 exposes to atmosphere. The small pressure differential deflects the thin film, which generates the signal Si. The processing unit can process this signal, as noted above, to identify flow or "leak" rate Q or other parameters that can quantify fugitive emissions from the device.

Figure 3:
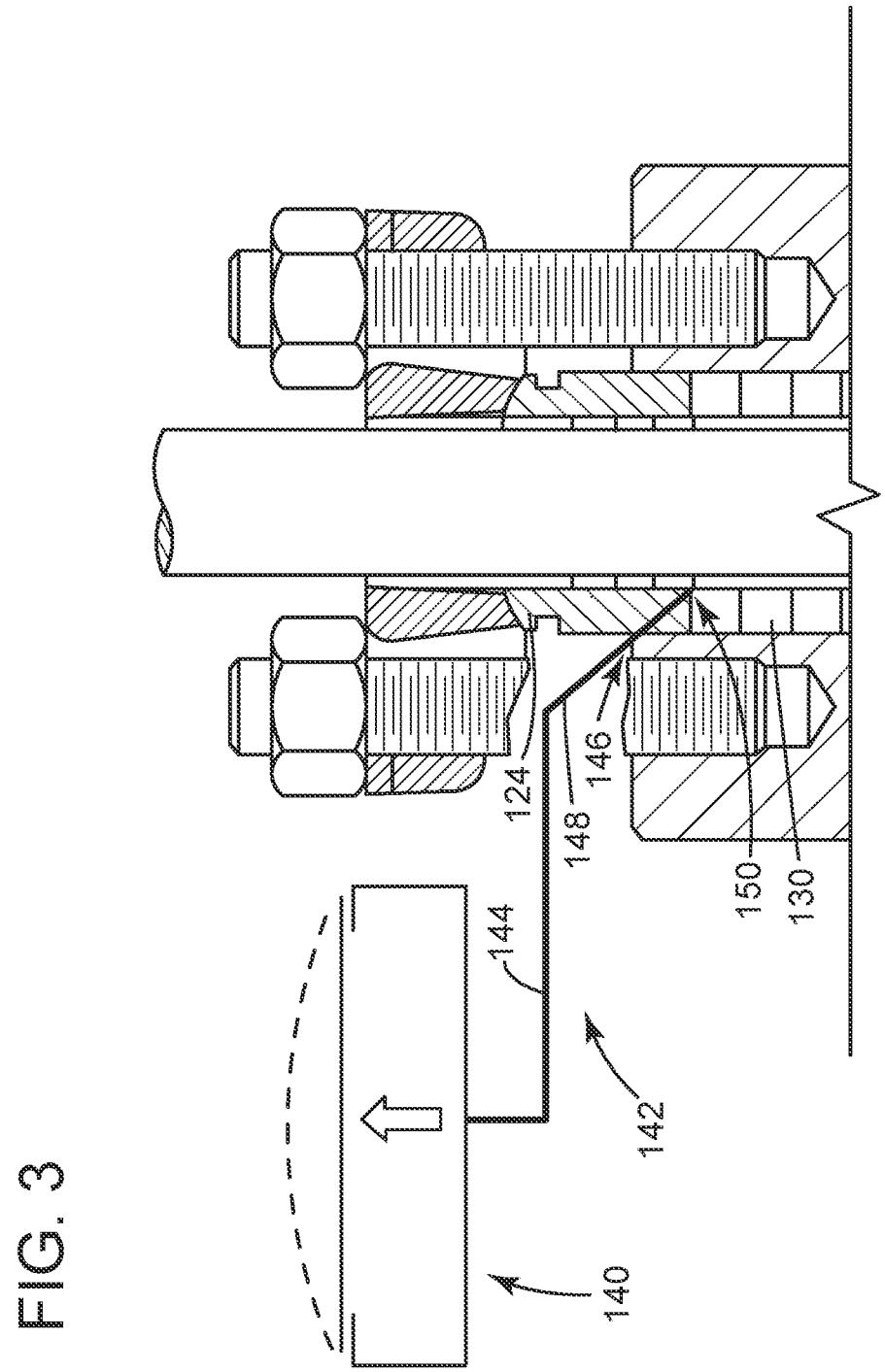
FIG. 3 depicts an elevation view of the cross-section of exemplary structure for the emission sensor of FIG. 1.

FIG. 3 depicts a schematic diagram of an exemplary structure for the emission sensor 100 of FIG. 1. This example has a "remote" sensing device 140 that houses the thin film. A flow passage 142 may connect the thin film with flow of fugitive emissions from the packing unit 118. In one implementation, the flow passage 142 may include a conduit 144, like a plastic tube, that connects to a port 146 on the follower 124. The port 146 may connect to a passage 148 that terminates at an opening 150 proximate an interface between the follower 124 and the packing material 130. The interface is shown here at the "top" of the packing material 130. This configuration can direct flow of fugitive emissions to the sensing device 140. The flow may impinge on the thin film, which can induce pressure differential and, in turn, generate the signal Si, even at the very low flow rates consistent with "leaking" emissions consistent with the valve assembly 102.

Figure 4:
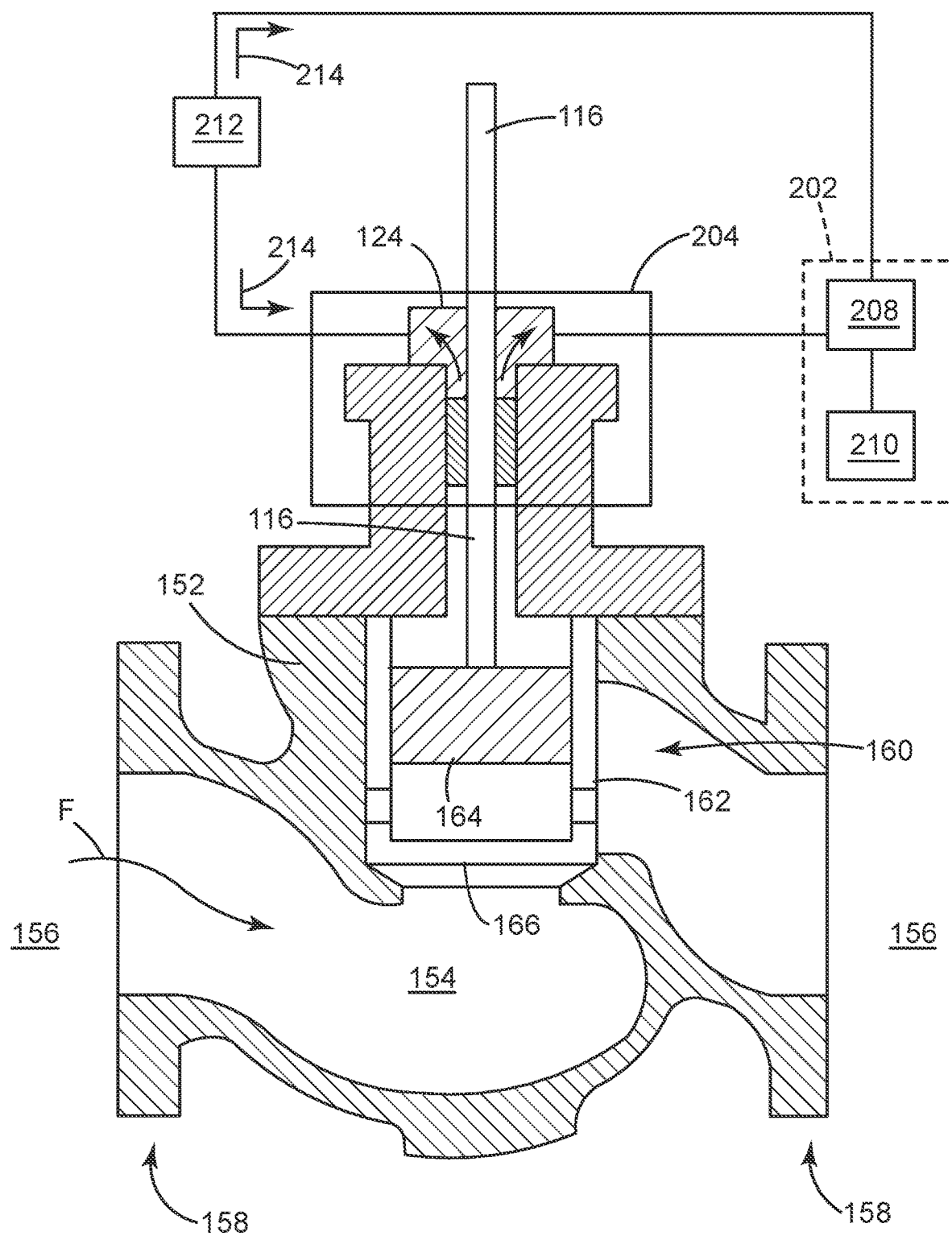
FIG. 4 depicts an elevation view of the cross-section of exemplary structure for a flow control.

FIG. 4 depicts an elevation view of the cross-section of exemplary structure for the valve assembly 102 of FIG. 1. The bonnet 134 may couple with a valve body 152, typically a cast or machined metal member. The valve body 152 may have an interior cavity 154 that forms a flow path between open ends 156. Flanges 158 at the open ends 156 can connect to adjacent conduit, like pipes or pipeline. These connections allow material to flow into (and out of) the valve body 152. The flow may pass through a trim assembly 160 that may reside in the interior cavity 154. The trim assembly 160 may include a cage 162 that houses a closure member 164. A seat 166 may reside just below the cage 162. In use, the valve stem 116 may couple the actuator 112 (FIG. 1) with the closure member 160. The actuator 112 (FIG. 1) may control the position of the closure member 164 relative to a seat 166 to regulate flow of material through the trim assembly 160.

In view of the foregoing, the improvements herein are useful to manage operation of flow controls. The embodiments outfit these devices to detect flow of fluid through certain interfaces slowly, over long periods of time. The piezo-electric sensors, for example, are sensitive to very low flow or very low pressure flows, which are characteristics of fugitive emissions from the packing-valve stem interface. These fugitive emissions may indicate that the packing material is in need of service.

The examples below include certain elements or clauses one or more of which may be combined with other elements and clauses to describe embodiments contemplated within the scope and spirit of this disclosure. The scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A flow control, comprising:
   a shaft having an elongate body with an outer surface;
   a follower insertable onto the shaft, the follower having,
      an inner surface and an outer surface,
      an annular groove disposed on the inner surface proximate the outer surface of the shaft, and
      a vent extending from the outer surface to the groove, and
   a piezo-electric sensor disposed in the groove and having a first side in proximity to the outer surface of the shaft to detect flow of fluid along the outer surface of the shaft,
   wherein the vent is located on a second side of the piezo-electric sensor.

2. The flow control of claim 1, further comprising:
   packing material disposed about the outer surface of the shafts.

3. The flow control of claim 1, further comprising:
   packing material disposed about the outer surface of the shaft and below the follower.

4. The flow control of claim 1, further comprising:
   a processing unit coupled with the piezo-electric sensor,
   wherein the processing unit is operative to process a signal from the piezo-electric sensor to quantify flow of fluid.

5. The flow control of claim 1, further comprising:
   a processing unit coupled with the piezo-electric sensor,
   wherein the processing unit is operative to process a signal from the piezo-electric sensor to generate a flow rate of the flow of fluid.

6. The flow control of claim 1, wherein the piezo-electric sensor comprises a film of material.

7. The flow control of claim 1, wherein the piezo-electric sensor is configured to deflect in response to the flow of fluid.

8. The flow control of claim 1, further comprising:
   a bonnet with a bore,
   wherein the follower is disposed in the bore.

9. The flow control of claim 1, further comprising:
   a bonnet with a bore; and
   a cap couple to the bonnet,
   wherein the follower is disposed in the bore and is in contact with the cap.

10. The flow control of claim 1, further comprising:
    a bonnet with a bore;
    packing material disposed in the bore; and
    a bushing disposed in the bore in contact with the packing material,
    wherein the follower is disposed in the bore in contact with the packing material.

* * * * *